May 14, 1963   F. BOULET ET AL   3,089,235
METHODS OF MAKING THIN REINFORCED DIAPHRAGMS AND IN
DIAPHRAGMS MADE ACCORDING TO THESE METHODS
Filed May 2, 1958

3,089,235

METHODS OF MAKING THIN REINFORCED DIAPHRAGMS AND IN DIAPHRAGMS MADE ACCORDING TO THESE METHODS

Francis Boulet, Massy, Pierre Plurien, Paris, Maurice Quenault, Palaiseau, and Roger Rigot, Paris, France, assignors to Commissariat a l'Energie Atomique, Paris, France, a State administration of France
Filed May 2, 1958, Ser. No. 732,591
Claims priority, application France May 4, 1957
6 Claims. (Cl. 29—527)

The present invention relates to methods of making thin reinforced diaphragms and to the diaphragms obtained by such methods.

It is known that several kinds of apparatus include, as structural element thereof, a very thin diaphragm, i.e. a diaphraghm of a thickness of some tens of microns for instance. Such elements are used in particular as diffusion barriers in apparatus for the separation of gases by molecular diffusion and also as targets including a metal layer contiguous to an insulating layer and intended to be used in some storage tubes.

It has already been proposed, in order to improve the mechanical resistance of such diaphragms to reinforce them by means of a very fine metal grid (the distance between the bars of said grid being about 100 microns for instance and the thickness of the grid averaging some tens of microns for instance).

However, up to now, it was not possible to obtain an accurate parallelism (with an accuracy of the order of the micron) between the grid and the wall of the element of the diaphragm opposed to that which carries said grid although such a parallelism is highly desirable in most cases to ensure a good operation and a long life of the diaphragm.

The object of our invention is to provide a very thin reinforced diaphragm which complies with the above mentioned conditions.

For this purpose, the method according to our invention comprises starting from a thin metal sheet free from any structural defect and the opposite walls of which are parallel to each other, mechanically shaping said sheet so as to form stiffening projections on at least one of said walls thereof and to give the areas of said sheet located between said projections the desired thickness, and subjecting the resulting product to a transformation treatment capable of imparting given characteristics to the material thereof, this treatment being such nature that the transformation it produces travels gradually from the surface to the inside of the treated material, said treatment being conducted to a degree such that, at the places where said reinforcing projections are located, where the thickness is greater than at the other parts of the article, the whole thickness of the metal is not transformed.

The present invention is particularly suitable for the obtainment of microporous diffusion diaphragms. In this case, the metal of the sheet is chosen so as to be capable of being transformed by a suitable treatment into a microporous material.

For this purpose, said transformation treatment is an anodic oxidizing treatment.

Preferably, the metal of the sheet consists of aluminium or an alloy or compound of aluminum.

Our invention is also suitable for the obtainment of targets for use in storage tubes. In this case, the projections are provided on only one face of the sheet, the other face thereof being smooth.

Furthermore, the transformation treatment is a treatment capable of transforming the metal of the sheet into an insulating material.

This treatment is applied to the smooth face of the sheet so that its effect travels through the sheet in the direction of the face thereof which carries the stiffening projections.

After this treatment at least a portion of the smooth face is metallized, for instance by evaporation in a vacuum, whereby said smooth face acts as an insulating support for the metal film thus produced by metallizing.

In a preferred embodiment of this method of making targets, the metal of the sheets is aluminium or an aluminium alloy or compound and the transformation treatment is an anodic oxidizing treatment.

Preferred embodiments of our invention will be hereinafter described with reference to the appended drawings given merely by way of example and in which.

Figure 1:
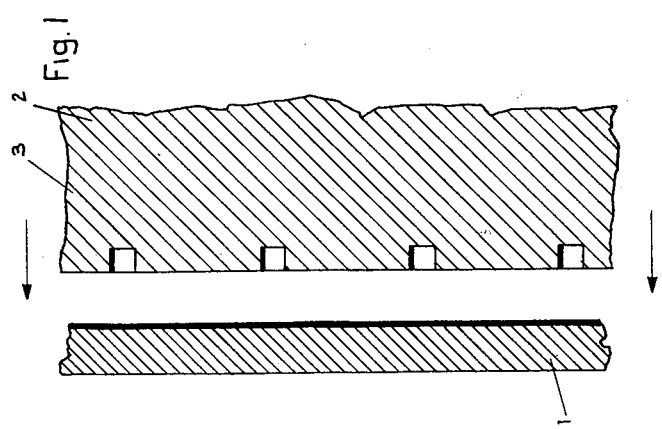
FIG. 1 is a cross sectional view of a smooth metal sheet intended to be treated for the obtainment of a microporous diaphragm, this sheet being stamped by means of a tool shown also in sectional view on FIG. 1.

FIG. 1 shows a very thin metal sheet 1 for the obtainment of a diaphragm according to the invention. This sheet may be made of aluminium of a degree of purity of 99.99%, or an aluminium alloy for instance AlMg. The area of said sheet may be relatively great, for instance several meters.

Figure 6:
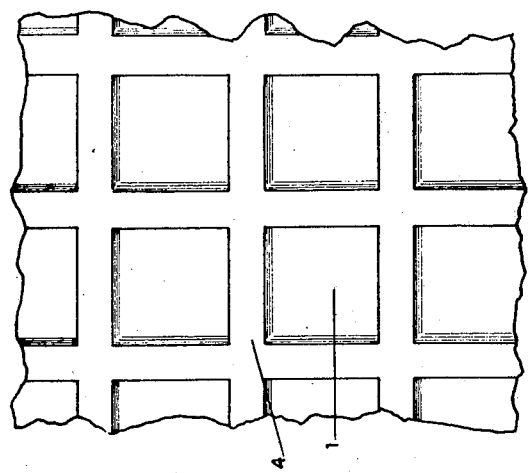
FIG. 6 is a front view of the structure of FIGS. 2, 3, 4 and 5.

This sheet is subjected to a shaping operation so as to form stiffening projections on one face thereof. This shaping operation may be performed by any suitable mechanical means, for instance by pressing or passing the sheet between a rolling cylinder provided with suitable hollows and a smooth rolling cylinder. The same result may also be obtained by chemical attack of one face of the sheet after protected areas have been formed thereon. For instance FIG. 1 shows in section a steel tool 2 on which a network of grooves 3 has been performed, for instance by photo-engraving. The application of this tool on sheet 1 forms on one face thereof a network of ridges 4 which limit hollow areas as visible on FIGS. 2 and 6.

It must be noted that this network must be very fine and may have for instance as much as six ridges per linear millimeter.

The thickness of the flat portions of the shaped sheet may range from 10 to 30 microns and the ridges may project from said flat portions at a distance equal to said thickness or several times greater than it.

Sheet 1 is then subjected to an anodic oxiding treatment. The electrolyte baths used for this purpose may for instance contain sulfuric acid, oxalic acid, chromic acid, phosphoric acid or mixtures of these acids.

Oxidation takes place gradually from the surface toward the inside but only from the smooth face of the sheet, the other face thereof being protected against the action of the bath through suitable means.

When the oxidation has reached the bases of the ridges, which is ascertained by a suitable optical method (examination of the transparency of the sheet) or an electrical method (measurement of the current flowing through the bath, which decreases as oxidation is taking place), the operation is stopped.

At the end of this operation, the oxide that is obtained is translucent and slightly opalescent.

Figures 2, 3, 4, 5:
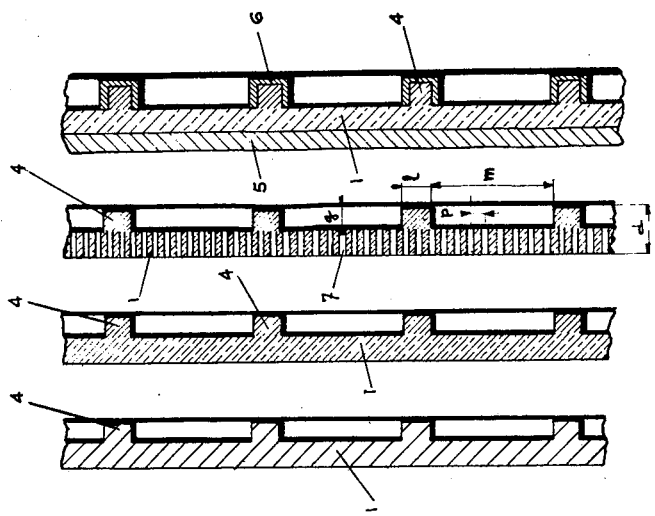
FIG. 2 is a cross sectional view of the sheet after said mechanical shaping.
FIG. 3 is a cross sectional view of the sheet of FIG. 2 after it has undergone an anodic oxidizing treatment.
FIG. 4 is a cross sectional view of the sheet of FIG. 3 after treatment thereof to give it a predetermined porosity.
FIG. 5 is a cross sectional view of the sheet of FIG. 3 after metallizing of the smooth face thereof and coating of the grid with a non oxidizable deposit.

FIG. 3 shows that, after this oxidizing operation, the whole thickness of sheet 1 is transformed into an insulating layer of aluminum oxide, whereas ridges 4, which have not been oxidized, remain in the metal state and constitute the grid integral with diaphragm 1.

If it is desired to obtain a gaseous diffusion barrier, the oxide layer must be wholly porous when the oxidizing treatment is stopped and for this purpose the nature of the bath, its concentration, the electric voltage, the duration of the oxidizing treatment and the temperature are chosen in accordance with the desired radius to be obtained for the pores and with the desired number of pores to be obtained per sq. cm. For instance, in a 20% sulfuric acid bath under a voltage of 12 volts and at a temperature of 24° C., two hours are necessary to oxidize a thickness of 20 microns. On the other hand, a permanent and intensive stirring is necessary. The dimensions of the alumina areas and the effective transparency of the diaphragm are determined in accordance with the mechanical resistance of the alumina deposits.

However, oxidation is a rather complicated phenomenon and the propagation of the oxidized layer from the surface toward the inside is not a homogeneous phenomenon. Experience teaches that there exists between the pure metal and the porous layer a layer of non-permeable alumina the thickness of which is the greater as the voltage is higher. At the end of the oxidizing treatment, this layer occupies the bottoms of the recesses between the ridges and it clogs the pores. In order to obviate this drawback, several solutions have been considered:

(a) The oxidizing treatment may be conducted in a tank forming two compartments, the elements to be oxidized forming the partition between these two compartments. In these conditions, one face of said element is in contact with the oxidizing bath, the other face being immersed in an intensively cooled bath so as to avoid the formation, by local heating, of a very anhydrous alumina. A good stirring is necessary. The oxidized plate is subsequently dehydrated, for instance by immersing it in acetone.

(b) It is also possible to deposit, for instance by evaporation, a metallic layer, for instance a layer of aluminium, on the sheet on the face thereof opposed to that where oxidation will start. When the effect of the anodic oxidizing treatment reaches the layer of aluminum thus applied on said face, this aluminum is in turn oxidized. The operation is stopped when the smooth portion of the sheet is translucent. As the continuity between the aluminum sheet and the layer of aluminum formed thereon by evaporation is very poor due to the presence of natural oxide, it is easy to separate this last mentioned layer by dipping the sheet in a liquid other than water, for instance in alcohol. After some minutes, the two sheets are separated nearly instantaneously from each other.

(c) We may also proceed to a chemical modification of the non permeable layer. For this purpose, the alumina sheet may be immersed in a suitable bath, for instance an aqueous solution or an alcaline hypobromite or hypochlorite or a solution in alcohol of chlorinated derivatives of amides. In this way, we obtain an improvement in the porosity.

On the other hand, corrosion tests with uranium hexafluoride ($UF_6$) were performed with the MacBaine balance on samples having specific areas ranging from 60 to 80 sq. cm. per gram (the specific area is the ratio of the surface of the pores to the weight of the material which constitutes the diaphragm). An irreversible absorption was found, corresponding to the deposit of a mono-molecular layer of $UF_6$.

With reference to FIG. 4, we will hereinafter describe two examples for carrying out the method according to the invention.

FIG. 4 shows the same structure as FIG. 3 but the pores 7 are visible on FIG. 4.

*Example I*

The mechanical shaping having been performed as above, we obtained a diaphragm having the following dimensions:

Total thickness $d=28$ microns,
Thickness of the portion forming the grid, $g=15-20$ microns,
Width of a bar of the grid, $l=60-80$ microns,
Width of the area between two bars, $m=$approximately 200 microns.

The experimental conditions were as follows:

Electrolysis bath: $SO_4H_2$—18%,
Duration: about 2 hours,
Temperature: 19°,
Potential difference: 15 volts.

The diaphragm that was obtained had the following properties:

Mean diameter of the pores: 180 A.,
Distance $p$ between the centers of the pores: 385 A.,
Number of pores per sq. cm.: $120 \times 10^9$.

*Example II*

The experimental conditions were as follows:

Electrolysis bath: $SO_4H_2$—14%,
Duration: about 2 hours,
Temperature: 19°,
Potential difference: 8 volts.

The diaphragm that was obtained had the following properties:

Mean diameter of the pores: 90 A.,
Distance $p$ between the centers of the pores: 300 A.,
Number of pores per sq. cm.: $200 \times 10^9$.

FIG. 5 relates to the obtainment of targets for storage tubes. In this case, the smooth face of the structure shown by FIG. 3 is metallized in any suitable manner and possibly the metal grid is lined with a metal layer, for instance by means of an electrolytic bath, in order to protect the ridges against subsequent oxidizing due for instance to contact with air.

FIG. 5 thus shows in section the finished target the insulating layer 1 of which has been metallized at 5 on the face opposed to that carrying ridges 4, whereas said ridges are coated with a non oxidizable metal 6, for instance gold.

Experience taught that the method above described makes it possible to make targets the grids of which have their bars at a distance of some hundreds of microns from one another, the thickness of sheet 1 being so some tens of microns, the distance between grid 4 and the metallized surface 5 being constant with an approximation of at most 1 micron over the whole area of the target.

Anyway, the thin diaphragm elements obtained according to this invention have good mechanical resistance qualities and a satisfactory resistance to chemical corrosion.

What we claim is:

1. The method of making a reinforced thin diaphragm which comprises starting from a thin sheet of a metal that is oxidizable in an electrolyte to form a microporous layer of oxide adhering strongly to the metal surface free from any structural defect and the opposite walls of which are parallel to each other, mechanically shaping said sheet so as to form stiffening projections on one face thereof and to give the areas of said sheet located between said projections the desired thickness the other face of said sheet being left smooth, and subjecting said smooth face of said sheet to an oxidizing treatment to such a degree that said stiffening projections remain unoxidized but that the remaining thickness of the sheet is substantially oxidized.

2. The method which comprises starting from a thin sheet of a metal at least mainly constituted by aluminium free from impurities, the opposite walls of said sheet being parallel to each other, mechanically shaping said sheet to form on one face thereof a network of stiffening ridges extending in two directions transverse to each other and to give the areas of said sheet between said ridges the desired thickness, the other face of said sheet being left smooth, and subjecting said smooth face of said sheet to an oxidizing treatment to such a degree that, in the portions of said sheet that carry said ridges, the whole thickness of the sheet is not oxidized.

3. The method of making a reinforced thin diaphragm which comprises starting from a thin sheet of a metal that is oxidizable in an electrolyte to form a microporous layer of oxide adhering strongly to the metal surface free from any structural defect and the opposite walls of which are parallel to each other, forming stiffening projections on one face of the metal sheet while giving the areas of said sheet located between said projections the desired thickness, the other face of said sheet being left smooth and subjecting said smooth face of said sheet to an oxidizing treatment to such a degree that said stiffening projections remain unoxidized but that the remaining thickness of the sheet is substantially oxidized.

4. A method according to claim 3 which further comprises metallizing said smooth face after it has been oxidized.

5. A method according to claim 3 which further comprises covering said ridges with a layer of a non oxidizable metal.

6. A method according to claim 3 in which said treatment is an anodic oxidizing treatment.

References Cited in the file of this patent

UNITED STATES PATENTS

| | | |
|---|---|---|
| 2,174,840 | Robinson et al. | Oct. 3, 1939 |
| 2,243,979 | Reynolds | June 3, 1941 |
| 2,380,505 | DeVore | July 31, 1945 |
| 2,563,488 | Rose | Aug. 7, 1951 |
| 2,594,820 | Stern | Apr. 29, 1952 |
| 2,632,693 | Jenkins | Mar. 24, 1953 |
| 2,704,884 | Ingels | Mar. 29, 1955 |
| 2,819,419 | Delano et al. | Jan. 7, 1958 |